(12) United States Patent
Thandu et al.

(10) Patent No.: US 8,620,319 B1
(45) Date of Patent: Dec. 31, 2013

(54) INTELLIGENT ALGORITHM TO DETERMINE SERVICE AVAILABILITY AND PRESENTATION TO USER

(75) Inventors: Balasubramaniam Kulasekaran Thandu, Cedar Park, TX (US); Melvin Duane Frerking, Norcross, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1415 days.

(21) Appl. No.: 11/739,627

(22) Filed: Apr. 24, 2007

(51) Int. Cl.
*H04W 36/00* (2009.01)

(52) U.S. Cl.
USPC ........ 455/436; 455/559; 455/461; 455/435.3; 455/440; 455/441; 455/435.2; 455/448; 370/331; 370/332

(58) Field of Classification Search
USPC .............. 455/436, 559, 461, 435.3, 440, 441, 455/435.2; 370/331, 332
See application file for complete search history.

(56) References Cited

U.S. PATENT DOCUMENTS

| 2003/0114158 A1* | 6/2003 | Soderbacka et al. | 455/436 |
| 2003/0190917 A1* | 10/2003 | De Cambray-Mathan | 455/446 |
| 2005/0288024 A1* | 12/2005 | Song | 455/441 |
| 2007/0060197 A1* | 3/2007 | Park et al. | 455/552.1 |

* cited by examiner

*Primary Examiner* — Nimesh Patel
(74) *Attorney, Agent, or Firm* — Turocy & Watson, LLP

(57) ABSTRACT

A system and method is disclosed for selectively masking or revealing an availability of mobile voice and data services associated with a mobile device when a handoff frequency from data capable to data-limited networks exceeds a threshold. The system can include components that can detect a network handoff event, compute a handoff frequency and compare the handoff frequency to a threshold. Additional components can mask availability of voice and data services at mobile device based on the comparison. Also disclosed is a method for determining a mobile device location, mapping RF signal quality of data capable networks surrounding the location, and indicating an impending loss of service if the RF signal quality falls below a quality threshold.

21 Claims, 12 Drawing Sheets

INTELLIGENT ALGORITHM TO DETERMINE SERVICE AVAILABILITY AND PRESENTATION TO USER

BACKGROUND

The mobile telephone industry has been associated with tremendous growth over the last several years. For instance, in the recent past, mobile telephones were only available to those of highest economic status due to service costs and costs associated with mobile phones. In contrast, today's portable phones (and other portable devices) have become relatively inexpensive and more widely utilized by large numbers of consumers. Furthermore, many mobile network service providers offer phones at extremely low cost to customers who contract for service with such providers. Contracts of this nature typically involve a small monthly service fee and allow a consumer to pay for the phone and the service in small increments over time. The flexible methods for purchasing mobile phones and mobile phone services have opened up these devices to members of all economic status.

In conjunction with their increased popularity, mobile phones have rapidly developed increased computing capabilities. More specifically, commonly available mobile phones can be utilized as full-service computing machines. For example, many of the most recent and advanced mobile phones can be associated with word processing software, accounting software, and various other types of software. Furthermore, network coverage has expanded to cover millions, if not billions, of users. Additionally, mobile phones have decreased in size. Specifically, modern mobile phones are often small enough to slip into an individual's pocket without discomforting the individual.

Advances in technology relating to mobile devices in general, and mobile phones in particular, continue to occur. For example, recently mobile telephones have been designed to communicate over disparate networks and/or between licensed and unlicensed spectra. In more detail, a multimode handset can connect to a cellular network to effectuate communications between a user of the mobile phone and another phone device, and can further connect by way of WiFi, Bluetooth, and the like and thereafter utilize the Voice over Internet Protocol (VoIP) (or other suitable protocol) to effectuate communication between users. Use of VoIP is often desirable to users as it is associated with less cost than employing a cellular network. In fact, some users may consider phone calls made over VoIP (or other IP-based network) completely free, despite the fact that they pay for Internet service.

Implementation of this multimode service is due at least in part to the Third Generation Partnership Project (3GPP) and Third Generation Partnership Project 2 (3GPP2), and similar standardization efforts, which have created specifications that define a mechanism that provides signal integrity for session initiation protocol (SIP) signals between an IP multimedia subsystem (IMS) and user equipment (UE) (e.g., a mobile phone, a personal digital assistant, . . . ). This integrity prevents identity spoofing, man-in-the-middle attacks, and the like. The IMS represents a 3GPP and 3GPP2 effort to define an all-IP-based wireless network as a replacement for the various voice, data, signaling, and control network elements currently in existence. Furthermore, the IMS enables support for IP multimedia applications within the Universal Mobile Telecommunications System (UMTS). The UMTS includes a 3G broadband packet-based transmission of text, digitized voice, video, and multimedia that offers a consistent set of services to mobile computer and phone users regardless of their physical location.

The telecom industry is currently shifting towards all IP-systems, thereby rendering multimode service handsets an important tool (as they are compatible with existing cellular systems and emerging IP-systems). This shift is driven by desires to reduce costs and create new streams of revenue while protecting an operator business model. IMS is a new service domain that facilitates this shift by enabling convergence of data, speech, and network technology over an IP-based infrastructure. For users, IMS-based services enable transmittal and receipt of various data at significantly reduced cost, including voice, text, pictures, video, and/or any combination thereof in a highly personalized and secure manner. In summary, IMS is designed to bridge the gap between existing, traditional telecommunications technology and Internet technology that increased bandwidth does not provide.

As stated above, these emerging IP-based technologies have created demand for multimode services, and thus for multimode handsets. Using this technology, users can employ one of the many wireless LAN (WLAN) and cellular technologies supported by the handset to effectuate voice calls, transmission of data, and the like. WLAN networks are traditionally based upon an IP infrastructure and therefore inherently support IP based communication. Telecommunication networks have had to alter infrastructure components and protocols in order to integrate IMS-based IP data services, however. This work is currently under way, as traditional second generation (2G) circuit-switched voice transmission infrastructure and protocols are overlaid or replaced with third generation (3G) IMS and IP telecommunication counterparts.

At present, mobile phones often encounter both 2G and 3G networks while maintaining radio frequency (RF) contact with a telecom provider since the full transition from 2G to 3G networks will take some years to complete. Because, in general, a fully functional 3G network is required to provide IMS services, availability of those services can dissipate when a mobile phone switches, or is handed-off, from a 3G to a 2G network. Handoff commonly occurs when a mobile phone roams a distance away from a RF network component greater than that required to maintain strong RF contact. Contact with another component must be established instead, so the mobile phone is handed-off from one component to another. Compounding this problem is the fact that a geographical area covered by a network can fluctuate over time depending on several factors, including signal interference with neighboring networks and an amount of RF traffic being handled at a given time. This implies that a mobile phone may be handed off from a 3G to a 2G network even while remaining stationary, resulting in a loss of 3G services. Moreover, due to restrictions in VoIP emergency call services, if a mobile phone is handed-off from a 3G to a 2G network during a call, it must remain on the 2G network until the call is completed. If a mobile subscriber had been in the midst of utilizing a 3G service transmission during that call, for example streaming real-time video simultaneously with the telephone call, an abrupt loss of services can be frustrating. Furthermore, the VoIP restrictions require the mobile user to end the call before reacquiring a 3G network signal and resuming a video share application.

Until the 3G network infrastructure is complete and mature, it can be difficult to prevent interruption of services flowing from a 3G to 2G handoff. Worse still, when handoff occurs frequently, a dubious light can be cast upon otherwise robust services. It is of utmost import that a mobile provider's services appear robust at a user-level, however, or the reputation and acceptance of those services can falter.

SUMMARY

The following presents a simplified summary of the disclosure in order to provide a basic understanding of some aspects of the full written description. This summary is not an extensive overview of the disclosure. It is not intended to identify key/critical elements of the invention or to delineate the scope of the invention. Its sole purpose is to present some concepts of the invention in a simplified form as a prelude to the more detailed description that is presented later.

The subject disclosure relates to intelligently determining availability of communication features and selectively providing such features based in part of the determined availability. An aspect relates to determining whether a coverage area in which a device is located provides an acceptable level of reliability for simultaneous voice and data services (or voice and data services). A frequency for which a multi-mode device is handed-off from a data capable network to a data-limited network is measured. Such hand-off frequency can be compared to a threshold frequency. Additionally, voice and data services associated with the multi-mode device can be selectively masked and revealed dependent at least in part upon the comparison of hand-off frequency and threshold frequency. Components that measure a handoff frequency and compare such frequency to a threshold frequency can be proximate a mobile device, proximate a network component or components, or proximate interactions between such device and network, or combinations thereof.

Another aspect relates to monitoring a location of a mobile device, measuring dynamic fluctuations in surrounding data-capable network strength, and indicating a probability of losing mobile voice and data services due to network fluctuations at a particular position. Moreover, the system can monitor device location to determine a direction and rate of travel of a moving mobile device, and indicate to a user an impending loss of voice and data services as a result of anticipated travel out of range of a data-capable mobile network. Components for measuring mobile device location, measuring surrounding network coverage, and making predictive comparisons between those measurements can reside proximate a mobile device, proximate a network component or components, or proximate interactions between such device and network, or combinations thereof.

In addition, the subject disclosure relates to a system and method for measuring quality of network signal strength over time, comparing that measured quality to a threshold quality related to a particular data application service, and selectively masking and revealing availability of one or more data application services based on a comparison of measured signal quality and a requisite signal quality for a service or group of services. Moreover, the system can refer to a mobile device user profile, created by a mobile subscriber, to make specific determinations as to whether a particular voice and data service can be revealed despite potential loss of voice and data services. System components can be located proximate a mobile device, a network component, and/or interactions between the device and network.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
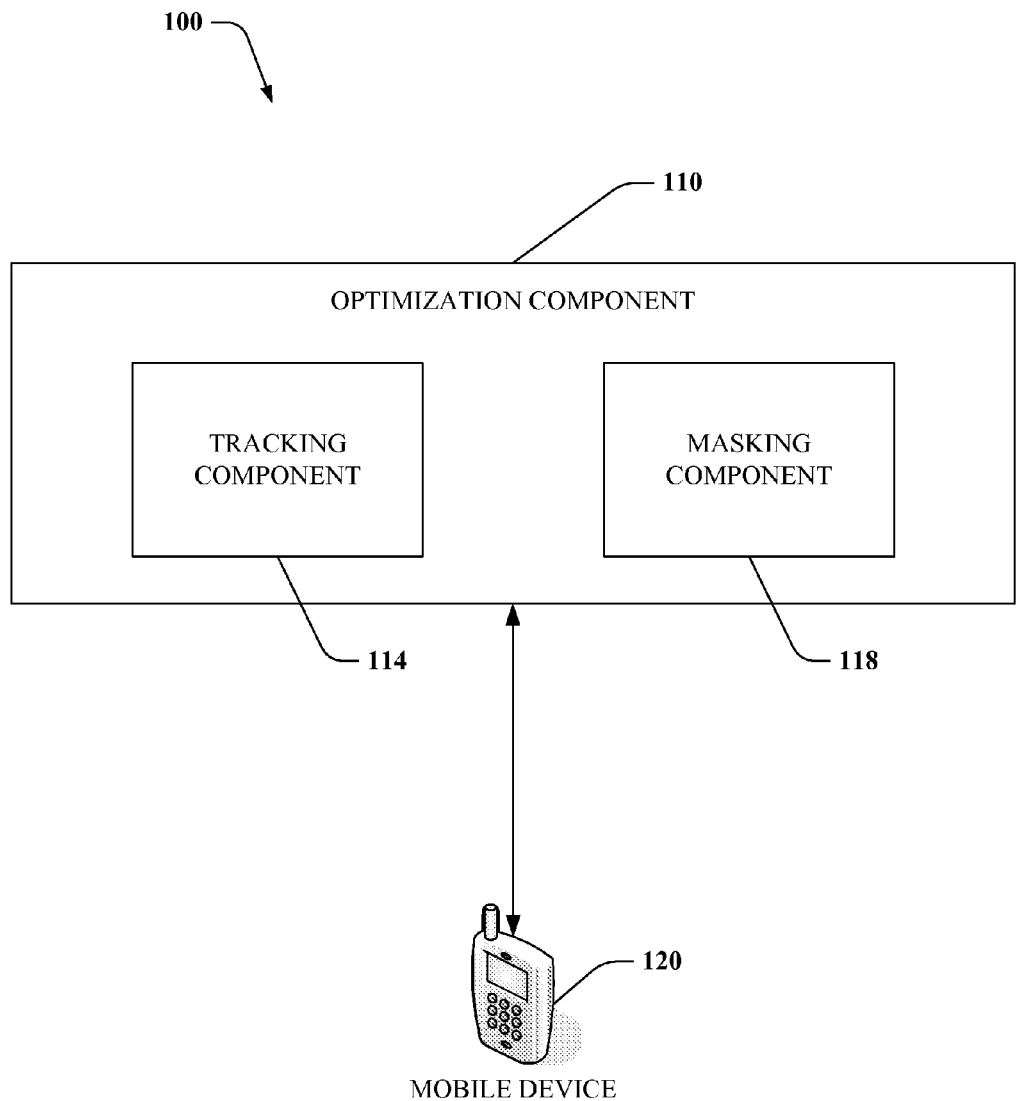
FIG. 1 illustrates a high-level system that can determine sufficient network support for mobile device services and selectively provide access to supported services.

The disclosed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that such matter can be practiced without these specific details. In other instances, well-known structures and devices are shown in block diagram form in order to facilitate describing the claimed subject matter.

As used in this application, the terms "component," "system" and the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Referring now to FIG. 1, a high-level system 100 is displayed that can determine network support for mobile device services and selectively provide access to supported services. An optimization component 110 can measure and/or calculate such network support and reveal services (e.g., as displayed at a mobile device 120) that are sufficiently supported by one or more networks, and mask services that have insufficient network support. Network support can be determined by a tracking component 114 that can measure and/or record a number of times that mobile device 120 is handed off from a data capable network to a data-limited network within a period of time (e.g., where a number of handoffs over a period of time can indicate a handoff frequency). A handoff frequency can be compared to a threshold frequency associated with a service or set of services to determine whether network support for such service(s) is sufficient. Services can be masked by masking component 118, which can selectively expose or hide a service and/or group of services depending upon network support determined by tracking component 114. Services can include, for instance, data services such as Internet browsing and download services, e-mail, instant messaging and text mail, images, ring-tone services, and like data services, as well as combined voice and data services, such as streaming video, streaming audio, concurrent audio, etc. Moreover, each service (or, e.g., a set thereof) can be associated with a predetermined threshold handoff frequency related to sufficient network support for the service.

It should be appreciated that a data capable network, as used herein, can include, for instance, networks capable of providing simultaneous voice and data communications and/or services (e.g., 3G networks, such as universal mobile telecommunication system (UMTS)/wideband code division multiple access (W-CDMA)/high speed packet access (HSPA) networks and the like, fourth generation (4G) networks, including Worldwide interoperability for Microwave Access (WiMAX) and like high bandwidth wireless and/or wired communication networks, or other suitable networks capable of providing simultaneous voice and data transfer services). Data-limited networks can include, for instance, voice only or alternative voice or data only networks (e.g., first generation (1G) or second generation (2G) voice only networks, or similar networks that do not facilitate transfer of data information, packet information, or the like or advanced second generation (2.5G) networks including 2G networks overlaid with a limited packet access network that can provide voice services or data services, but not simultaneous voice and data services, or optionally that facilitate transfer of data but in a manner insufficient to support a particular simultaneous voice and data service or set of services).

System 100 can improve reliability of data services, as experienced by a mobile device (120) user for instance, by exposing services (e.g., via masking component 118) that are likely to provide uninterrupted use and by masking services determined potentially unreliable. Selectively masking and revealing an availability of data services can be important to maintain service integrity and user confidence in those services. For example, if a cellular telephone user initiates a call and opts to utilize one or more data services, e.g. streaming video, concurrent audio, etc., he or she might expect those services to continue for a particular duration, depending on the service. If support for a service dissipates mid-use, a user can be required to wait for network support for such services to be re-established (e.g., when mobile device 120 re-acquires an adequate RF communication signal with a third generation (3G) network, or like data capable network). This result can lead to a poor experience of otherwise robust services.

In addition to loss of service problems, certain emergency phone service restrictions including, e.g. E-911 services can further compound problems associated with network handoff. An E911 call architecture can require a call handed off from a data capable network to a data-limited network to remain on the data-limited network for the duration of the call. This requirement can be due to the fact that, for instance, some data network systems (e.g., some 3G networks, such as the UMTS network in current implementation) do not have an ability to geographically locate a communication device. Some emergency calls (e.g., E-911 services that depend on geographical location capabilities) might then be handed off to conventional networks (e.g., data-limited, 1G and/or 2G network, and the like) to utilize location capabilities already established with those networks. Additionally, telecom protocols can require that any call connected by way of a data limited network remain on such a network for the duration of the call. In such a scenario, handoff from a data limited network to a data capable network, therefore, can be restricted once a call begins on a data limited network. Moreover, as a corollary to the above example, a call begun on a data capable network, subsequently handed-off to a data-limited network, can be restricted from re-acquiring a data capable network signal until the call is ended. Thus, a user that desires to utilize data services may have to hang-up and re-initiate a call before re-connecting with a data capable network.

In light of these and similar restrictions on network handoff with regard to some network architectures, calls utilizing services requiring a data capable network, as defined herein, that are handed-off to data-limited networks can not only result in loss of data services and/or simultaneous voice and data services (voice and data services) but in a loss of an ability to reacquire a data capable network for the duration of a call. For a communication device user who initiates a simultaneous voice and data service (e.g. a caller who uses a streaming video service to stream video of a child's soccer match to a spouse who is unable to physically attend the match), losing that service mid-call and having to hang up to re-connect can be frustrating. Additionally, such intermittent service can create a negative experience of otherwise robust services. Consequently, masking an availability of a service and/or group of services unlikely to be supported for a threshold period of time can be a critical aspect of maintaining a positive user-experience of those services.

System 100 can track aspects of a mobile connection to evaluate support for data-related mobile services. For instance, support for a mobile service can be determined by comparing a handoff frequency related to data capable and data-limited networks to a threshold frequency associated with a service and/or group of services. A tracking component 114 can measure and/or record a handoff event and can calculate a handoff frequency related thereto (e.g., a handoff frequency can be equal to a number of handoff events per second). The handoff event(s) can be, for instance, a transfer of mobile communication (e.g., radio frequency wireless communication) related to mobile device 120 from one or more data capable networks (e.g., that provides data and/or data and voice services) to one or more data-limited networks or within a single network (e.g., transfer from a data capable portion of one network to data-limited portions within the network, or vice versa, or like occurrence).

For example, if a mobile device (120) is handed off from a 3G universal mobile telecommunication system (UMTS) network (or, e.g., a similar data capable network) to a 2G global system for mobile communication (GSM) network (or, e.g., a similar data-limited network), or vice versa, 3 times in a 10 minute period, the handoff frequency could be 0.3 handoffs per minute, or an appropriate ratio of other inverse time units (e.g., 0.005 handoffs per second). In addition, a frequency of handoffs from data to data-limited networks independent of the reverse, or vice versa, can be calculated by tracking component 114 (e.g., handoff events from data to data-limited networks can be recorded and analyzed, while handoff events from data-limited to data capable networks can be ignored, and vice versa). When a handoff frequency is calculated, it can then be compared to a predetermined threshold frequency associated with a service or set of services to determine whether network support for such service(s) is sufficient (e.g., a streaming video service may require a handoff frequency, as described supra, to be less than once per 10 minutes for such service to be deemed reliable; the predetermined threshold frequency for streaming video can be set at 1 handoff per 10 minutes).

Additionally, system 100 can map contemporaneous radio link qualities associated with network cells and/or sectors of a cell to anticipate handoff events. Tracking component 114 can map or pseudo-map individual sectors of a network (e.g., associated with different cells or portions of cells of a cellular network) and determine quality of service parameters (e.g., related to a mobile connection or connections) within those sectors. Examples of quality of service parameters can include a contemporaneous pilot strength associated with a connected mobile device (120), a level of concurrent traffic within a sector, a level of concurrent interference within a sector (e.g., defined by traffic in neighboring sectors and cells), or the like. These and similar parameters can be used to calculate a quality of service parameter associated with a cellular sector and/or group of sectors at various points in time. Additionally, a service and/or group of services available to mobile device 120 can have one or more predetermined quality of service parameters associated with them. Furthermore, a calculated quality of service associated with a cellular sector can be compared with a predetermined quality of service parameter(s) associated with the service or group of services. Such comparison of contemporaneous sector quality to predetermined service quality could determine whether a service is reliably supported in a particular sector at a given time. Geographical areas that are covered by a data network but with insufficient sector quality to support a service or group of services can be defined by tracking component 114 as, for instance, a gray area. Tracking component 114 can send any handoff frequencies and quality of service comparisons (including, e.g., gray area determinations) to masking component 118.

As discussed, system 100 can mask a service and/or group of services if it is determined that network support for such services drops below a reliable threshold (e.g., a sector or group of sectors is defined as a gray area). In particular, masking component 118 can selectively expose or hide availability of a mobile service and/or group of services to ensure that such services are robust when utilized. Exposing or hiding a service can be based on, for example, a comparison of a handoff frequency and a threshold associated with such service, or comparison of quality of service parameter(s) of a network cell or sector with a quality threshold. Hiding a particular service could comprise disabling such service at a user interface of mobile device 120. Exposing a hidden service can occur after a handoff frequency equals or drops below a threshold value, or when a quality of service parameter of a network cell or sector equals or rises above a threshold value (e.g., as determined by tracking component 114, supra) associated with a particular voice and data service or group of services.

Additionally, instead of disabling a voice and data service or group of services, masking component 118 can optionally indicate that support for such services is limited and that use of such a service can result in potential interruption, or sub-optimal performance. Such indication can be as a result of a handoff frequency rising above a threshold level for a service, as discussed above. This alternative approach can allow a device user to attempt to utilize a service, if necessary, while setting user-expectations of the service appropriately.

It is to be appreciated, that although FIG. 1 depicts mobile device 120 separate from other components of system 100 (e.g., optimization component 110, etc.), alternative embodiments are contemplated. For example, such components can reside proximate mobile device 120, proximate a communication network or network component, proximate both the network and mobile device 120, or separate from both, or comprise a subset of mobile device 120, a communication network, and/or interactions between them.

Mobile device 120, as used herein, can be any communication device that can access, transmit, and/or receive any suitable forms of communication (e.g., voice, data, video, imagery, and so forth) by way of at least a cellular communication infrastructure. Examples of devices include a dual-mode device, a dual-mode cellular phone, a multi-mode device, a multi-mode cellular device, a multi-mode cellular phone, a computer (e.g., laptop, desktop), a voice over Internet protocol (VoIP) phone, a personal digital assistant (PDA) and other devices.

Figure 2:
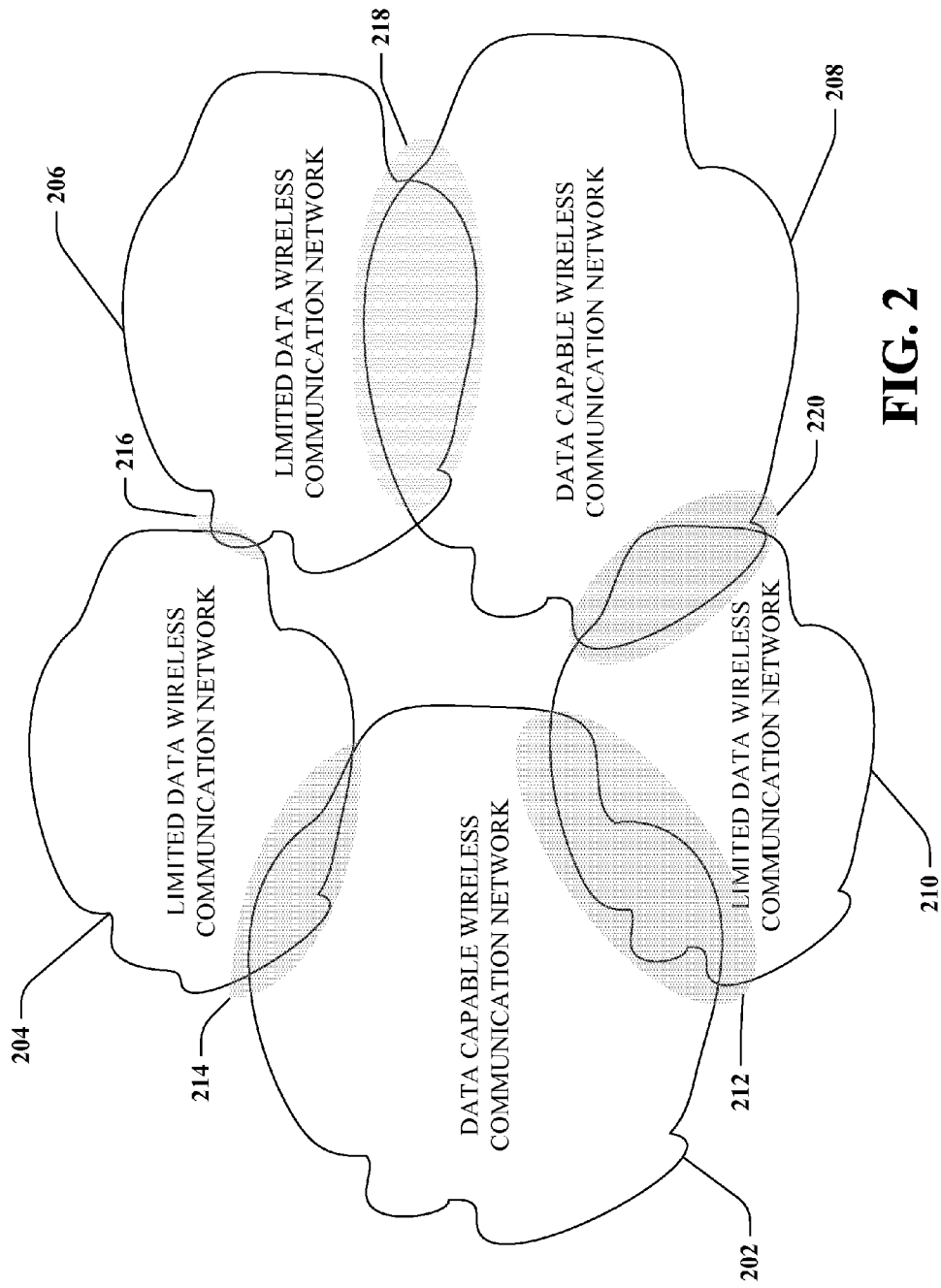
FIG. 2 is a diagram illustrating overlapping networks that can give rise to loss of mobile voice and data services in accord with disclosed embodiments.

FIG. 2 is an example diagram illustrating overlapping networks that can give rise to loss of mobile voice and data services in accord with disclosed embodiments. Data capable wireless communication networks are depicted at 202 and 208. Several data-limited wireless communication networks are also depicted, at 204, 206, and 210. For the example diagram of FIG. 2, the areas depicted by data capable and data-limited networks 202, 204, 206, 208, and 210 describe a geographic area over which a particular network can maintain an RF link with a mobile device. These geographic areas are not necessarily static, but can expand or contract over time due to various parameters as discussed in the subject disclosure (e.g., RF traffic, neighboring interference, etc.) As depicted, shaded areas 212, 214, 216, 218, and 220 indicate areas where a data-limited network and a data capable network overlap.

Typically, a mobile device located within a region covered by more than one network can choose to conduct communication via any of such networks. Likewise, when a mobile device is within a shaded area (212-220), the device can connect to either a data network or a data-limited network (or both) to facilitate end-to-end communication. However, as discussed supra, simultaneous voice and data services are typically available only via connection with certain networks. Therefore, a data capable device can typically choose to communicate with a data capable network so long as a sufficient radio link with such a network is available. But in areas near an edge of such a network's communication efficacy, such as shaded areas 212-220, a device can be forced to switch (e.g., handed off) to a data-limited network instead. The greater the likelihood that a cellular telephone will have to switch to a data-limited network to maintain a wireless connection with a communication network, the greater the likelihood that voice and data services will be interrupted. Therefore, determination of a handoff frequency (e.g., from data capable to data-limited network), and subsequent comparison to a threshold frequency, as discussed supra, can facilitate prediction of how robust a voice and data service will appear to a device user.

It should be appreciated that FIG. 2 depicts only a single example embodiment of overlapping network coverage. Numerous examples can exist, based on various factors such as network overlap, network fluctuation, network traffic, interference, or the like, for instance. Also, depicted shaded areas (212-220) are only some regions where network handoff can occur. Other example causes of network handoff, known to those of skill in the art or made known by the context provided by this particular example, are contemplated as part of the subject disclosure and incorporated herein.

Figure 3:
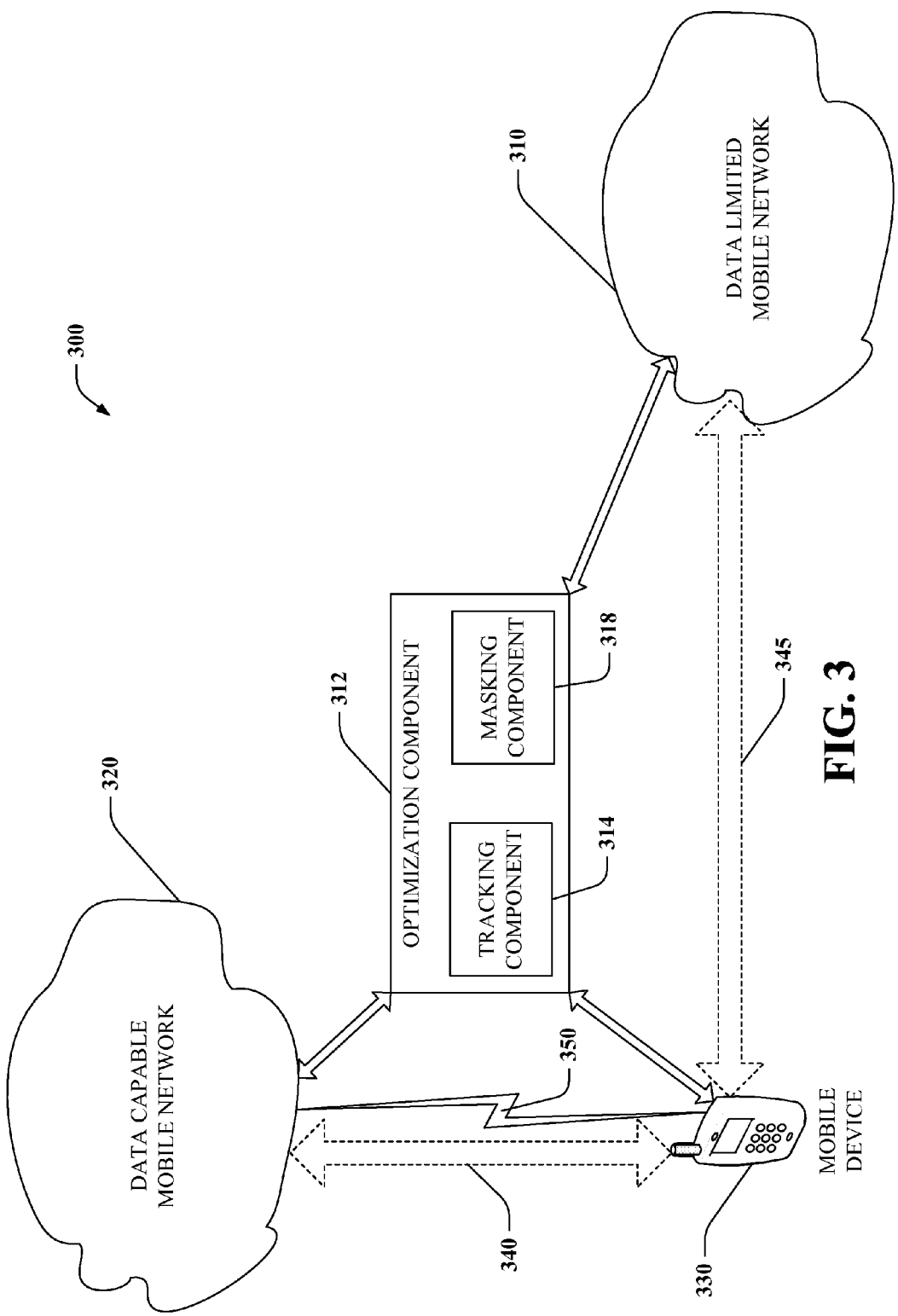
FIG. 3 illustrates a system that can determine network connection quality for multiple networks connected to a device in accord with aspects disclosed herein.

FIG. 3 illustrates a system 300 that can determine network connection quality for multiple networks connected to a device in accord with aspects disclosed herein. System 300 can furthermore measure a handoff frequency (e.g., from data capable to data-limited networks), and, in certain situations discussed infra, can attempt to determine whether an impending handoff will occur. Moreover, system 300 can selectively mask and reveal availability of mobile voice and data services based on a handoff frequency and/or a likelihood that a handoff will occur within a threshold period of time. In order to create context for the depiction of FIG. 3, two examples follow illustrating the concept of cellular handoff. Cellular handoff commonly occurs in at least two situations. For example, a cellular phone can move out of range of one cell transceiving component, e.g. a base station, and into range of another, closer, transceiving component. Second, if transmission bandwidth associated with a network component, e.g. a base station, is at full or near to full capacity a more reliable connection can be obtained with another network component. In either of the previous situations, an RF connection between mobile device (330) and a network component can be transferred to another component (e.g., a base station associated with a nearby network).

One method of transfer of a mobile device (330) from one network (310, 320) to another is typically known as a hard handoff, e.g. as used in Global System for Mobile communication (GSM) cellular networks. A hard handoff can occur, for example, when a mobile call is redirected from one network component utilizing one transmit/receive frequency pair to another network component utilizing another transmit/receive frequency pair without interrupting the call. Under this transfer paradigm, a mobile device can only be connected to one transceiving component at a time and therefore needs to terminate a communication link with a first transceiving component before establishing another link with a new component.

A second method of transfer is called a soft handoff, e.g. as used in CDMA networks. Such networks (and like networks that facilitate soft handoff) allow a mobile device to maintain a connection with more than one network transceiving component at a time. When a mobile device adds a connection with a transceiver (e.g., a transceiver capable of providing a strong radio link) or releases a connection with another transceiver (e.g., a transceiver capable of providing only a relatively weak radio link), a soft handoff occurs. The soft handoff is characterized by adding or releasing a connection with a transceiver independently of communication with one or more other transceivers.

Referring back to FIG. 3, RF links 340 and 345 constitute simultaneous RF links between mobile device 330 and a data capable mobile network 320 (e.g., a 3G UMTS/W-CDMA/HSPA, or similar network) and a data-limited mobile network 310 (e.g., a 2G GSM, TDMA, or similar network), respectively. Optimization component 312 can track a frequency with which mobile device 330 is handed-off from data capable mobile network 320 to data-limited mobile network 310, compare that frequency to a threshold frequency, and selectively hide and expose availability of services requiring data capable network connections at mobile device 330. In addition, optimization component 312 can monitor RF signal strength of RF link 340, or of multiple RF links between mobile device 330 and two or more data capable mobile networks (not shown), and indicate a potential loss of voice and data services related to mobile device 330. Such indication can result from measurement of a quality parameter associated with RF link 340, or with all RF links if more than one link to a data capable network exists, and comparison to a quality threshold associated with a service and/or group of services.

Tracking component 314 can determine what type of network mobile device 330 is connected to at a given time (e.g., 3G, 2G, etc.), and can also detect a network handoff event (e.g., data capable to data-limited) and compute a handoff frequency. Furthermore, tracking component 314 can monitor parameters associated with an RF signal quality of one or more RF links, e.g. RF links 340 and 345, between mobile device 330 and one or more mobile networks (310, 320). Examples of parameters relating to RF signal quality include a pilot strength associated with a connected device, a level of traffic within a sector, a level of interference (e.g., defined by traffic in neighboring sectors and/or cells), within a sector, or like factors or combinations thereof. Voice and data services available to mobile device 330 can have a threshold RF signal quality associated with them. Furthermore, a calculated signal quality (e.g., related to RF signal 340) between mobile device 330 and data capable mobile network 320 can be compared with a threshold RF signal quality associated with a voice and data service and/or group of services. This comparison of measured, contemporaneous RF signal quality and threshold RF signal quality could indicate whether one or more available data networks can reliably support a service or set of services at a given time.

For the example depicted in FIG. 3, mobile device 330 maintains only two RF links, 340 and 345. Consequently, only RF link 340 need be monitored in order to determine a handoff frequency or measure an RF signal quality. However, if RF links between mobile device 330 and multiple data capable network access points are present (not shown), services can be maintained so long as at least one RF link to a data capable network is maintained. Tracking component 314 can be configured to monitor RF links between mobile device 330 and two or more such access points (e.g., by analyzing communication at a serving general packet radio system support node (SGSN) of a UMTS network, that governs multiple radio access points associated with such network, or by analyzing similar communication with multiple access points at a device, or both). By doing so, a determination can be made as to whether RF signal quality of any of multiple RF links will support RF signal quality requirements of a service and/or set of services.

Tracking component 314 can send handoff frequency measurements and/or comparisons between measured and threshold RF signal quality to masking component 318. Masking component 318 can selectively hide or expose access to a voice and data service or set of voice and data services based, for example, on a handoff frequency and/or RF signal comparison to a threshold value. Such threshold value can be related to a desired network support for a particular service and/or set of services. Hiding a particular service would cause a service to be disabled (e.g., grayed out, unlisted, un-highlighted, or the like) at mobile device 330 until masking component 318 later exposes that service. Moreover, exposing a service can occur when a handoff frequency equals or drops below a threshold value, when a calculated RF signal quality equals or rises above a threshold RF signal quality, and/or, absent E-911 VoIP and similar restrictions discussed supra, when a RF link is re-established between mobile device 330 and a data capable mobile network (320).

Figure 4:
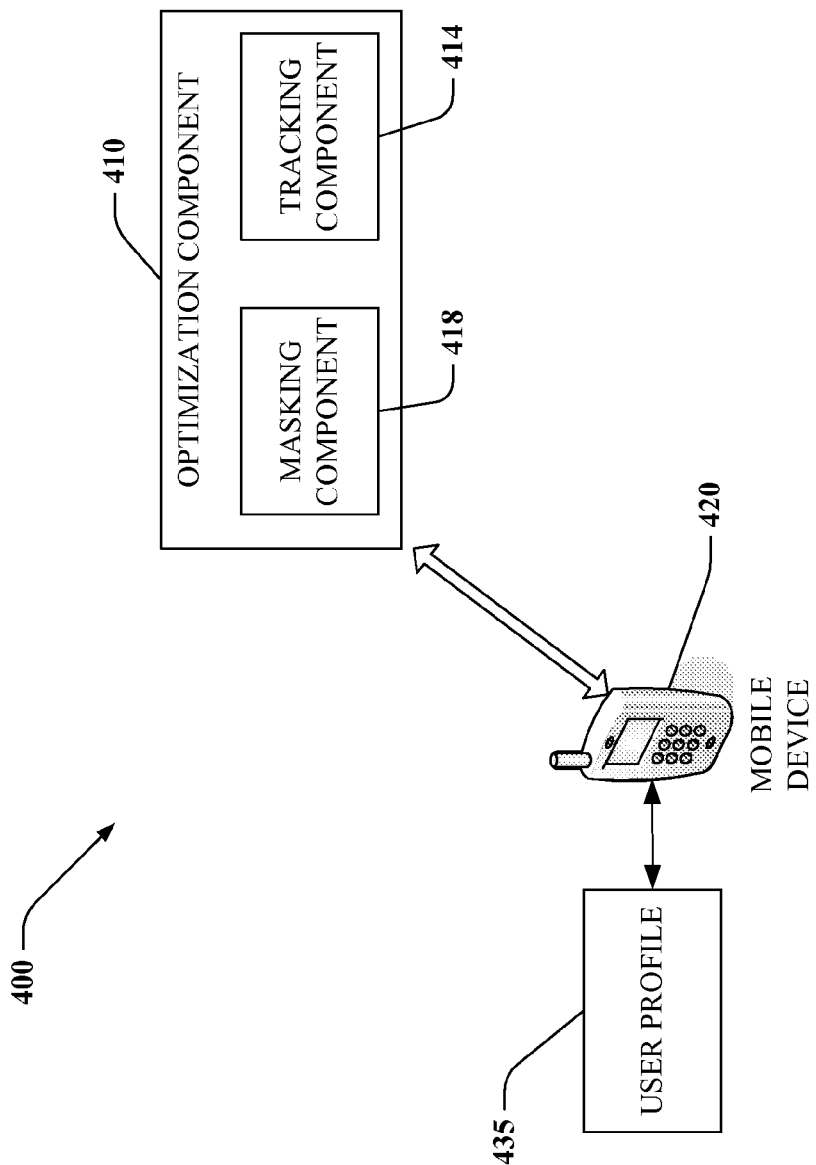
FIG. 4 illustrates a system of that determines a position and/or direction of travel of a device to selectively provide services in accordance with the one or more embodiments.

FIG. 4 depicts a system 400 for determining a handoff frequency and masking services at a mobile device 420 in accordance with a voice and data service user profile 435. Mobile device 420 can be any mobile communication device that can access, transmit, and/or receive voice and/or data information by way of a cellular communication infrastructure. Examples of mobile device 420 include a dual-mode device, a dual-mode cellular phone, a multi-mode device, a multi-mode phone, a computer, a VoIP phone, and a personal digital assistant PDA.

Optimization component 410 can track a frequency with which a cellular telephone is handed-off from a data capable to a data-limited network, compare that frequency to a threshold frequency, and selectively mask and reveal availability of services requiring data network connections according to user profile 435. In addition, optimization component 410 can monitor one or more wireless links between mobile device 420 and one or more data capable cellular networks (not shown), and indicate, according to user profile 435, a potential loss of radio link with such network(s) to mobile device 420 if a quality parameter associated with the one or more wireless links drops below a threshold.

Tracking component 414 can determine what type of network mobile device 420 is connected to at a given time, e.g. 3G network such as UMTS/W-CDMA/HSPA, or the like, 2G network such as GSM, TDMA, or the like, etc., and can also detect a handoff event from one such network to another for mobile device 420, and compute a handoff frequency. Furthermore, tracking component 414 can monitor parameters associated with a RF signal quality of one or more wireless links between mobile device 420 and one or more data capable networks (not shown). Examples of parameters relating to wireless link quality include a pilot strength associated with a cellular telephone, a quality indicator associated with a mobile device, a level of traffic within a sector, and a level of interference, defined by traffic in neighboring sectors and cells, within a sector. Voice and data services available to mobile device 420 can have a threshold wireless link quality associated with them. Furthermore, a calculated wireless link quality between mobile device 420 and a data capable mobile network can be compared with a threshold wireless link quality associated with a particular service or group of services. This comparison of contemporaneous wireless link quality to threshold wireless link quality could determine whether one or more available networks can reliably support a service or set of services at a given time.

Tracking component 414 can provide handoff frequencies and/or wireless link quality comparisons to masking component 418. Masking component 418 can selectively mask and reveal availability of a voice and data service or set of voice and data services if, for example, a handoff frequency from data capable to data-limited networks rises above a threshold value. In addition, when comparisons between calculated wireless link qualities drop below a threshold wireless link quality of one or more services, masking component 418 can indicate to mobile device 420 that support for a service or group of services is tenuous and that use of such service or group of services is done at risk of service termination or suboptimal performance. Indication can be done by way of any known user interface mechanism including, e.g. display of icons on a graphical user interface (GUI), playing an audio tone or verbal audio announcement, lighting an indicator light, etc. Furthermore, masking component 418 can reference user profile 435 to determine user preferences in regard to masking and/or revealing user services, and indicate whether support for a service or group of services is tenuous as specified by a user profile.

For example, user profile 435 can indicate that a user is to be queried before availability of a service is masked. Consequently, if a handoff frequency (e.g., from a 3G network, capable of providing reliable voice and data services, to a 2G network incapable of providing such services) rises above a threshold frequency, or a wireless link quality parameter drops below a threshold, masking component 418 would then proceed to query a mobile device (420) user. If a user indicates that masking a service(s) is acceptable, masking component 418 would proceed to mask and reveal services as described supra. In another example, a user can indicate that notification should or should not be given when a wireless link to one or more data capable networks drops below a threshold value. In this situation, when tracking component 414 determines network support for a service has become reliable (e.g., in a particular manner as specified herein) masking component 418 will reference user profile 435 to determine what action should be taken. If user profile 435 establishes that masking component 418 should alert a device user that network support is substandard, it will do so. If, however, user profile 435 establishes that no indication should occur, then masking component 418 will take no action.

Masking a particular service can disable user-activation of a service until masking component 418 later reveals that service. Revealing a service can occur when a handoff frequency equals or drops below a threshold value, when calculated RF signal qualities equal or rise above a threshold RF signal quality, and/or, absent E-911 VoIP and similar restrictions discussed supra, when a RF link is re-established between mobile device 420 and a data capable mobile network (e.g. data capable cellular network 320, of FIG. 3). Furthermore, services can be revealed when user profile 435 indicates that no service masking should occur. When a no masking specification is made, any previously masked services can be revealed e.g. by re-enabling those services and/or re-enabling the user interface access to those services.

Figure 5:
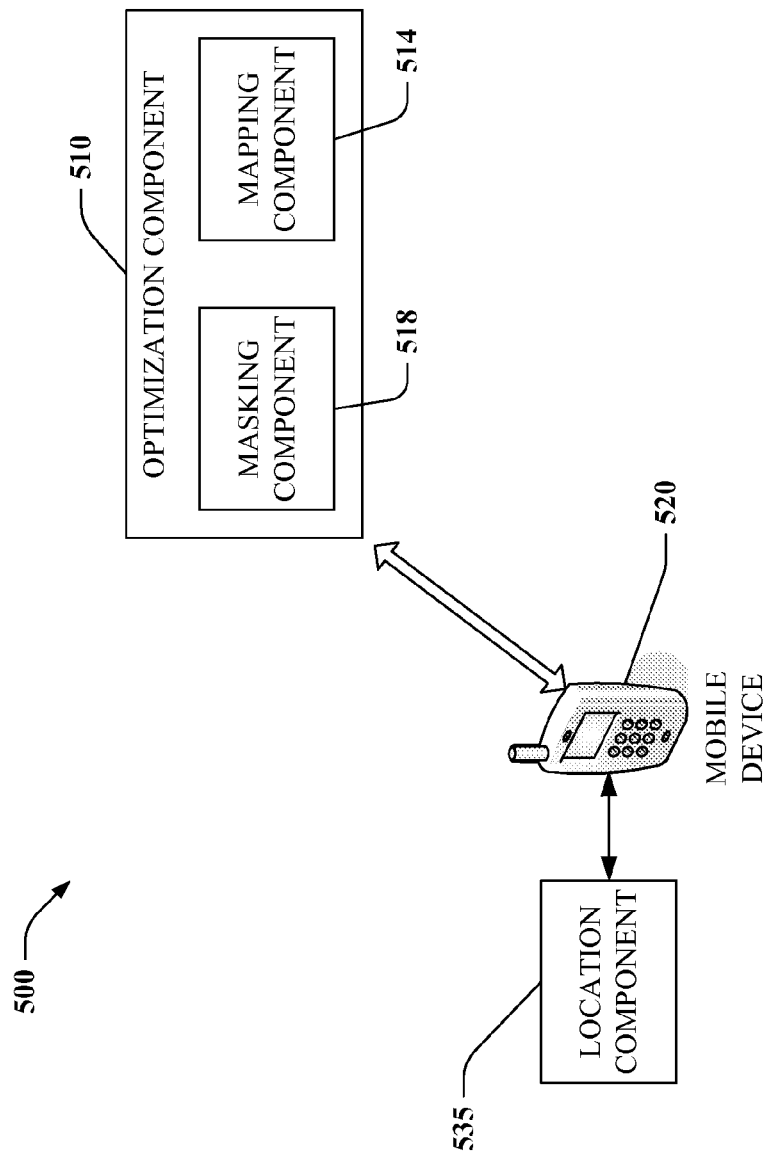
FIG. 5 is an illustration of a particular system that determines a position and/or direction of a travel of a device in accord with aspects disclosed herein.

FIG. 5 is an illustration of a particular system that determines a position and/or direction of travel of a device in accord with aspects disclosed herein. More specifically, system 500 can determine a location of a mobile device 520, map data transfer service quality associated with surrounding networks, and selectively mask and reveal voice and data services. Additionally, masking and revealing voice and data services can occur when service quality in surrounding networks drops below a threshold. Furthermore, system 500 can calculate a direction and speed of travel of cellular telephone 120 by taking subsequent location measurements, and indicate whether an impending loss of services is likely to occur due to projected travel outside of network service range.

System 500 can utilize, for example, a location component 535 associated with mobile device 520. Such location component 535 (e.g., navigational components associated with mobile device 520, a network location server that can locate a position of a mobile device from within a network, a Global Navigation Satellite System (SNSS) including GLONASS and Galileo systems, and other global positioning systems (GPS) components, hereinafter referred to collectively as GPS or GPS systems, or like device) can provide a contemporaneous location of such device. Mapping component 514 can identify and analyze individual sectors of communication networks and calculate a quality of service parameter associated with a cellular sector. Such networks can, for instance, be networks surrounding a device location, or within a projected travel path of a moving device. The analysis can determine whether surrounding networks support data transfer services, and can test the quality of connection available from those networks. Connection quality associated with identified data capable networks can be determined from parameters associated with mobile device 520, a network (not shown) and interactions between them. Examples of such parameters can include, a pilot strength associated with a cellular telephone, a level of traffic within a sector, and a level of interference, defined by traffic in neighboring sectors and cells, within a sector etc. Utilizing these parameters, mapping component 514 can calculate a connection quality for data capable networks surrounding a device location and/or in a projected travel path of mobile device 520.

Masking component 518 can selectively mask and reveal services and/or groups of services when surrounding network support drops below a threshold for such service or group of services. Furthermore, masking component can indicate a projected loss of services if network support of such services is below a threshold, or unavailable, along a projected path of travel, as described supra. System 500 therefore, can alert a mobile device (520) user to a likelihood that voice and data services (e.g., streaming video, e-mail, instant messaging, video sharing, audio sharing, etc.) will be lost. A user then can then decide to halt travel for a time sufficient to complete a particular voice and data service transmission. Alerting a device user as to an impending loss of voice and data services can contribute to a service's utility and increase user confidence in those services.

Figure 6:
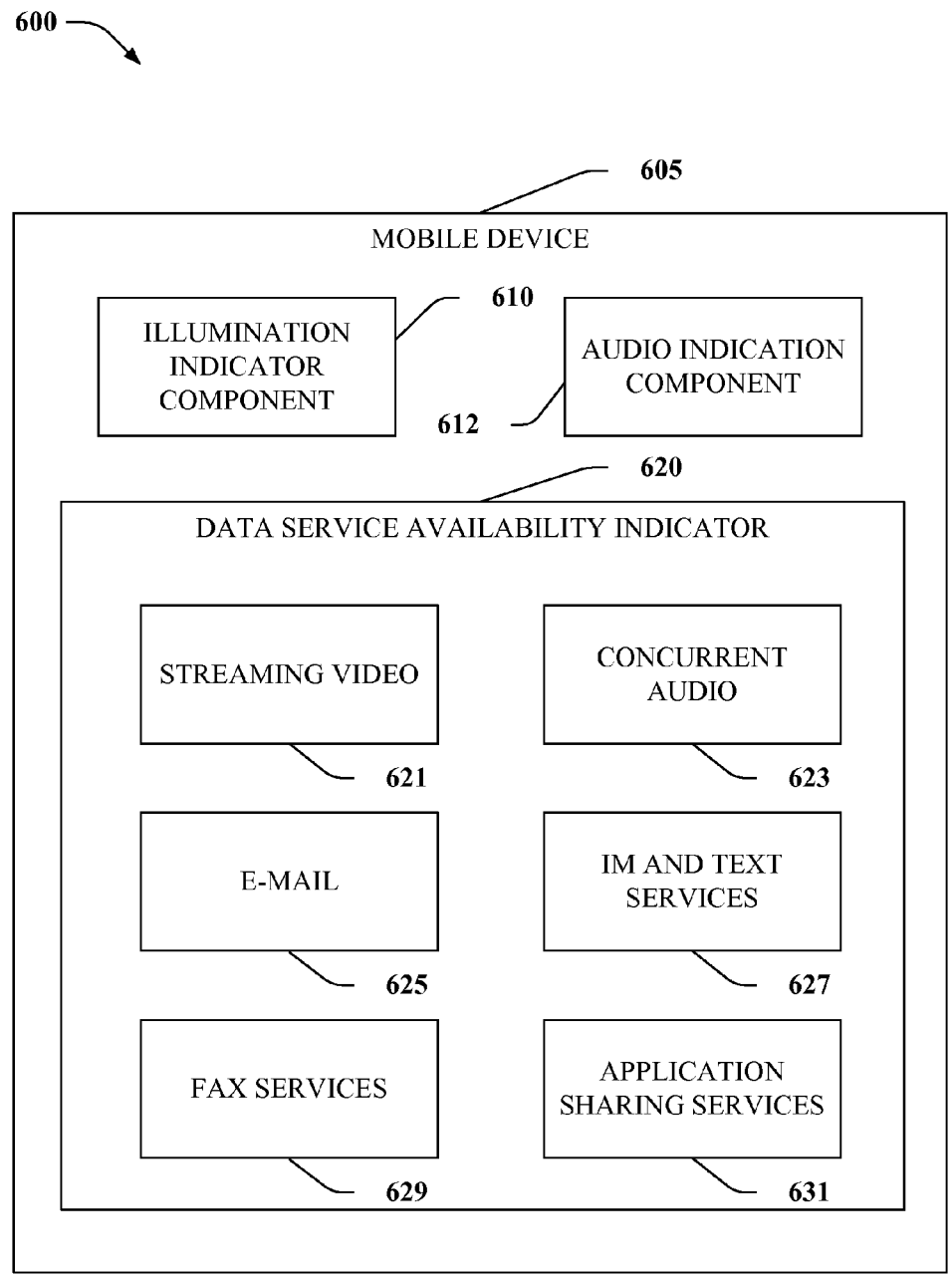
FIG. 6 is an exemplary user interface displaying available services.

Referring now to FIG. 6, an exemplary illustration of a user interface system 600 indicates voice and data services supported by a RF link with a data capable communication network. It should be appreciated that an exemplary illustration in accordance with the subject disclosure is only a single exemplary embodiment and should not be construed so as to limit the breadth of the disclosure as understood by one of ordinary skill in the art.

Mobile device 605 comprises an illumination indicator component 610, e.g., an led indicator etc., an audio indication component 612, and a graphical user interface (GUI) 620. Components (not shown) of mobile device 605, a communication network, and/or combinations thereof can measure a RF link quality between mobile device 605 and a communication network and compare that to a threshold RF link quality required by a voice and data service or group of services (e.g., as described herein). A comparison between measured RF link quality and threshold RF link quality can determine whether a service is fully, marginally, or not supported. In accordance with exemplary system 600, illumination indicator component 610 can illuminate to indicate that all services are supported by an instant RF link, or that some or all services are not supported, or both (e.g., a green light can indicate all services are supported, a yellow light can indicate some services are supported, a red light can indicate that no voice and data services are supported, or like variations of various colors and indications of network support of such services).

Audio indication component 612 can play audio tones and/or audio voice files (e.g. a mp3 file, a .wav file, etc.) to indicate a status of network support for voice and data services, e.g. whether they are fully, marginally, or not supported. Furthermore, audio tones and/or audio voice files can identify a status of specific services, e.g. a voice .wav file can announce that all streaming video and e-mail services are fully available. Audio tones and/or audio voice files can also indicate whether support is marginal for a particular service or group of services, that marginal support may cause a service to dissipate once begun, and/or recommend potential remedial measures to accommodate for this problem, e.g. refrain from using a service until support is more robust, move to an area fully supporting voice and data services, etc. One of skill in the art would readily recognize multiple different mechanisms for announcing support or lack of support for voice and data services, e.g. referencing services as a group, or playing audio tones reporting a status of individual services, etc.

A GUI 620 of a communication device can display icons representing supported voice and data services to indicate a sufficient RF link quality for each of such services. Services not sufficiently supported by an RF signal quality could either not be displayed at GUI 620 or could be indicated in some graphically distinct manner from supported voice and data service icons, e.g. grayed-out or a dashed border. As illustrated in FIG. 6, exemplary GUI icons include streaming video service icon 621, concurrent audio service icon 623, IM and text service icon 625, e-mail service icon 627, fax service icon 629, and application sharing service icon 631. All icons of GUI 620 are displayed prominently and in a similar graphical manner to indicate full support for all mobile voice and data services represented by those icons.

Figure 7:
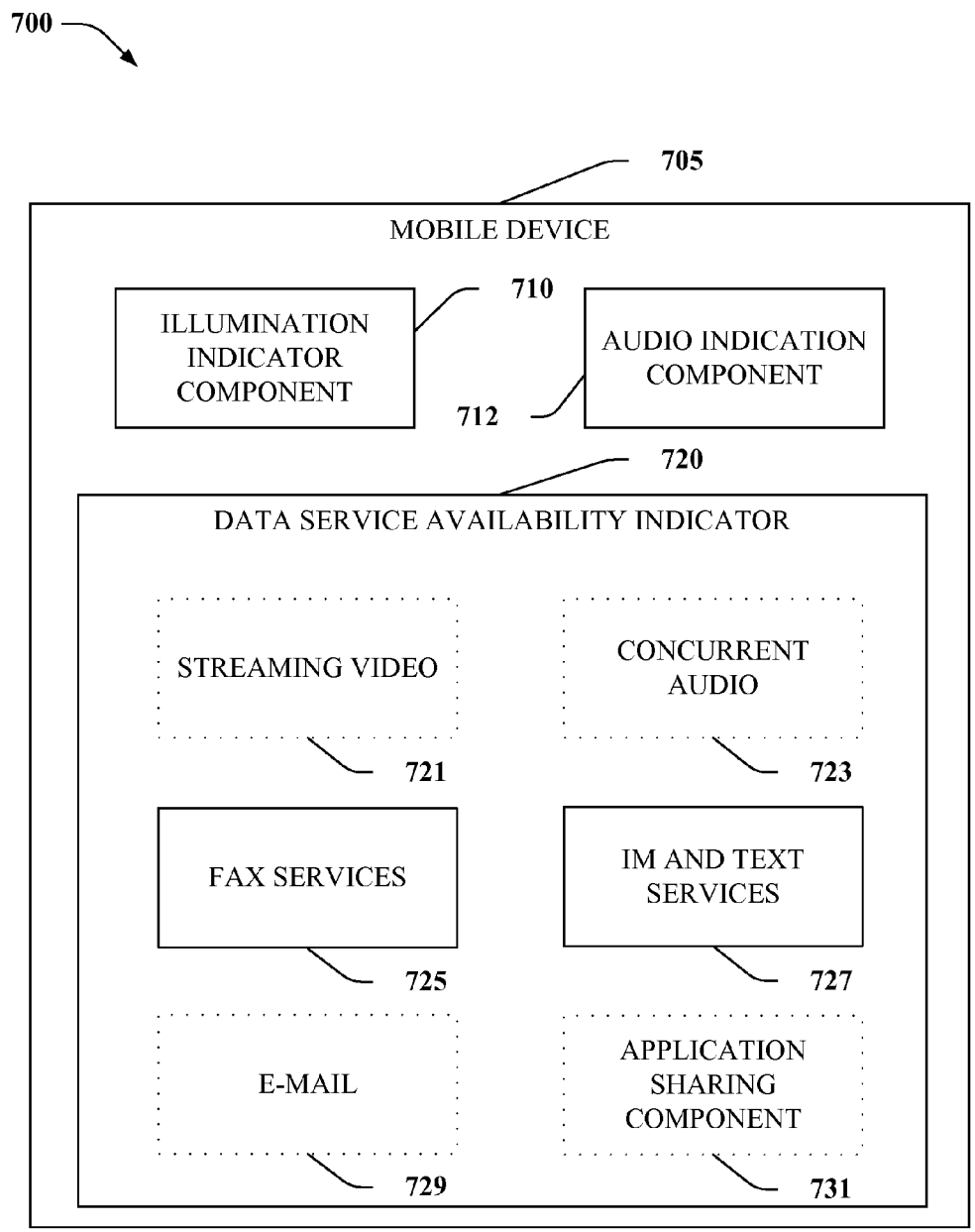
FIG. 7 is an exemplary user interface displaying limited service availability in accordance with the various embodiments disclosed herein.

FIG. 7 is an example user interface system 700 displaying limited service availability in accordance with the various embodiments disclosed herein. Limited service availability, in accordance with the illustration, can be due, e.g., to insufficient network support for such services within sufficient RF contact with mobile device 705. Illumination indicator component 710 can illuminate to indicate full support, partial support, or no support for one or more mobile voice and data services, as indicated supra. Audio indication component 712 can play a audio tones and/or audio voice files (e.g. a mp3 file, a .wav file, etc.) to indicate that mobile voice and data services are fully supported, that some services are not fully supported or that no services are supported by available RF links to communication networks. Audio tones and/or audio voice files can also indicate whether support is marginal for a particular service or group of services, that support for a service may dissipate once begun, and/or recommend potential remedial measures to accommodate for this problem (e.g., refrain from using a service until support is more robust, move to an area fully supporting voice and data services, etc.) One of skill in the art would readily recognize multiple different mechanisms for announcing support or lack of support for such services, e.g. referencing services as a group, or playing audio tones reporting a status of individual services, etc. Such mechanisms are contemplated as part of the subject specification and incorporated herein.

GUI 720 can be a graphical interface that can display icons representing one or more mobile voice and data services. Voice and data service icons can identify individual services and indicate whether a service or group of services is or is not supported by a contemporaneous RF link with a mobile communication network. As depicted in FIG. 7, several service icons can either be not displayed or displayed as graphically distinct from other service icons to indicate lack of support for such services. In accordance with the subject disclosure, not displaying or graphically distinguishing icons indicates that services represented by those icons are not available and/or not fully supported at a point in time. For example, streaming video icon 721, concurrent audio icon 723, e-mail icon 729 and application sharing service icon 731 are graphically distinct and/or not displayed in GUI 720 to indicate that those services are not fully supported and/or not contemporaneously available. In contrast, fax services icon 725, IM and text services icon 727 are displayed in a manner that indicates those services are currently supported by a RF signal with a mobile communication network. Other graphical representations of services known in the art, to distinguish between supported and unsupported voice and data services, are incorporated into the subject disclosure.

Figure 8:
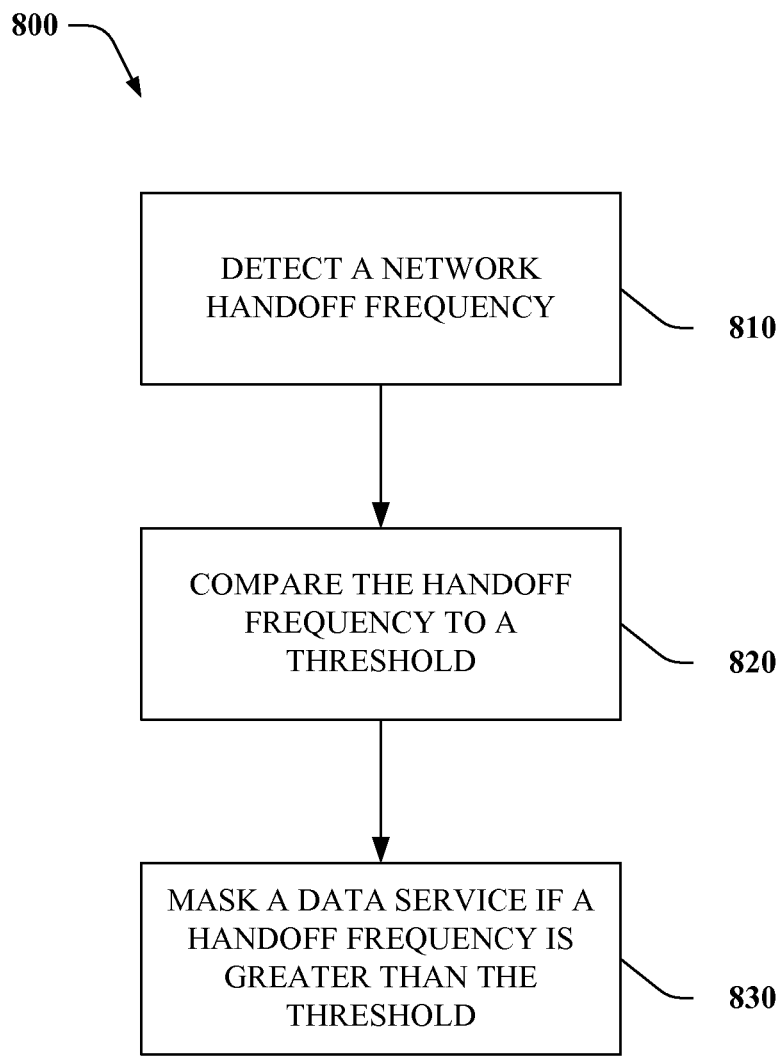
FIG. 8 is a high-level methodology for tracking a network handoff frequency and selectively providing availability to one or more services.

Referring now to FIG. 8, a high-level methodology is depicted in accordance with an aspect of the subject invention. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

More specifically, methodology 800 depicts a method for selectively masking and revealing availability of mobile voice and data services at a mobile device based on a comparison of a handoff frequency (e.g., related to number of times a device is handed off from data capable to data-limited networks in a period of time) and a threshold frequency. At 810, a handoff frequency, as described herein, is detected. Detection can be accomplished by components residing proximate a communication network, proximate a mobile device, a combination of both, or components independent of a network or mobile device. At 820, the handoff frequency is compared to a predetermined threshold handoff frequency. The threshold frequency can be determined by objective parameters relating to a service or group of services, and/or by voice and data service usage history of a particular mobile device, a user profile, or the like. For example, network or mobile device components can track and reference mobile service use-histories associated with a mobile device to anticipate duration-of-use for a particular service. Specifically, if a mobile device user utilizes streaming video for 5 minutes on average, a threshold handoff frequency associated with streaming video could be 1 handoff event (e.g., from a data capable to data-limited network) per 5 minutes.

At 830, availability of a voice and data service can be masked at a mobile device if the handoff frequency is greater than the threshold. For instance, if a data to data-limited network handoff frequency is greater than or approximately equal to a threshold handoff frequency associated with a service or group of services, availability of that service or group of services can be masked at the mobile device. Masked services can be disabled and unavailable until sufficient network support for such services are later determined, until a user specifies otherwise, or like condition is met. If the handoff frequency is less than a threshold frequency associated with a service or group of services, a service can be revealed and consequently enabled at a device.

Figure 9:
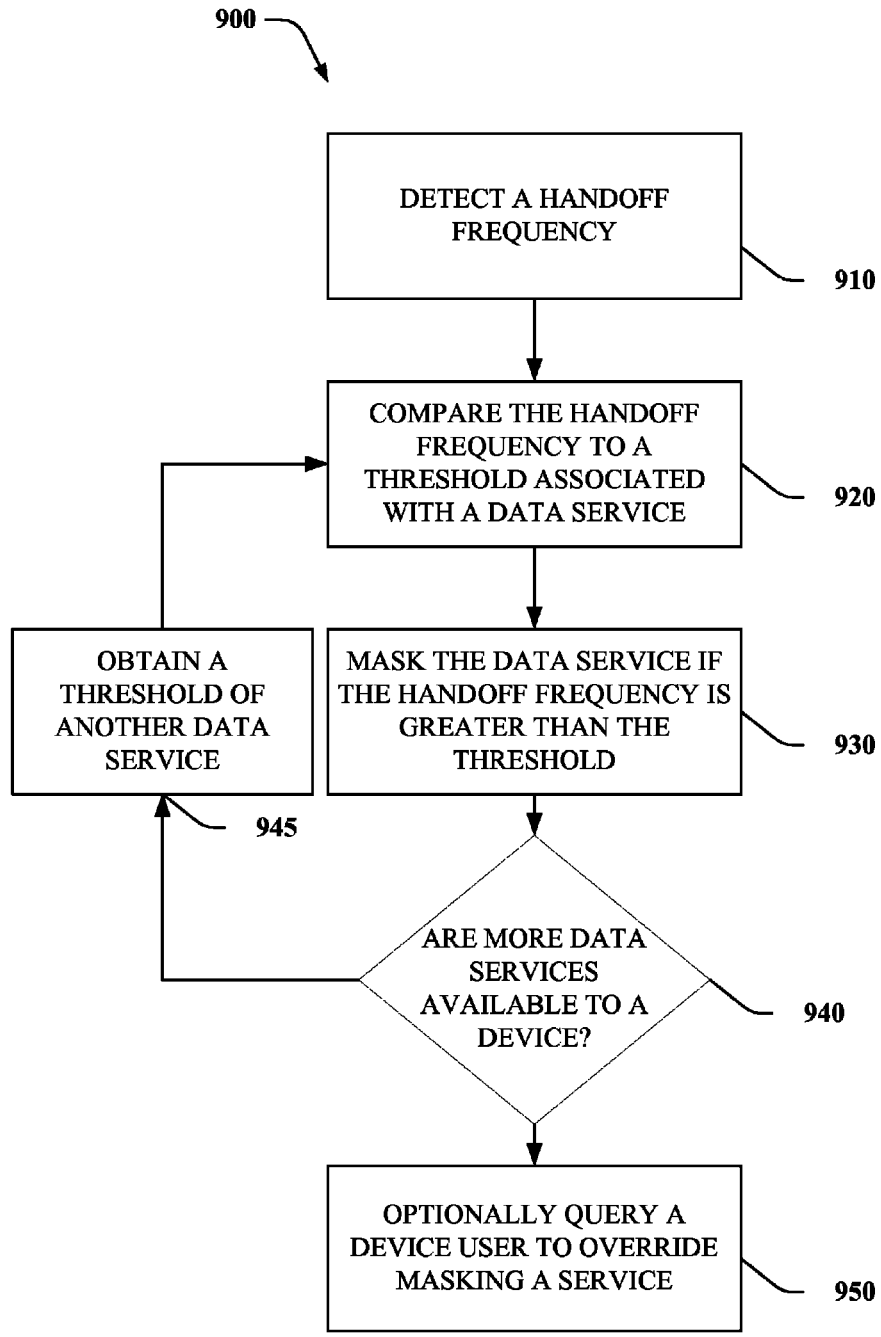
FIG. 9 is a methodology for comparing a handoff frequency to requisite signal strength for a particular service.

Referring now to FIG. 9, a methodology is illustrated for comparing a handoff frequency to requisite signal strength for a particular service. Specifically, methodology 900 provides for detecting a data to data-limited network handoff frequency associated with a mobile device, comparing that handoff frequency to a service threshold frequency, and masking a service based on such comparison. At 910, a handoff frequency is detected as described herein. At 920 the handoff frequency is compared to a first threshold frequency associated with a first mobile voice and data service of a set of such services. At 930, availability of the first mobile voice and data service is masked if the handoff frequency is greater than or approximately equal to the first threshold frequency. Masked services can optionally be disabled at a mobile device when their availability is masked, or instead hidden from display at a graphical user interface.

At 940, a determination is made as to whether more threshold frequencies associated with other mobile voice and data services remain for comparison to the handoff frequency. If not, methodology 900 proceeds to 950 where a device user is optionally queried as to whether they would like to proceed with use of a masked voice and data service despite the possibility of service interruption, defined supra. If, at 940, more threshold frequencies associated with other mobile voice and data services remain for comparison, methodology 900 proceeds from 940 to 945 and then to 920. At 945, a subsequent threshold frequency associated with a subsequent voice and data service is identified and obtained, and at 920 the subsequent threshold frequency is compared to the handoff frequency. Methodology 900 repeats reference numbers 920, 930, 940, and 945 until all threshold frequencies associated with all voice and data services of the set of mobile voice and data services are compared with the handoff frequency, and all such services are selectively masked or revealed based on the comparisons.

Figure 10:
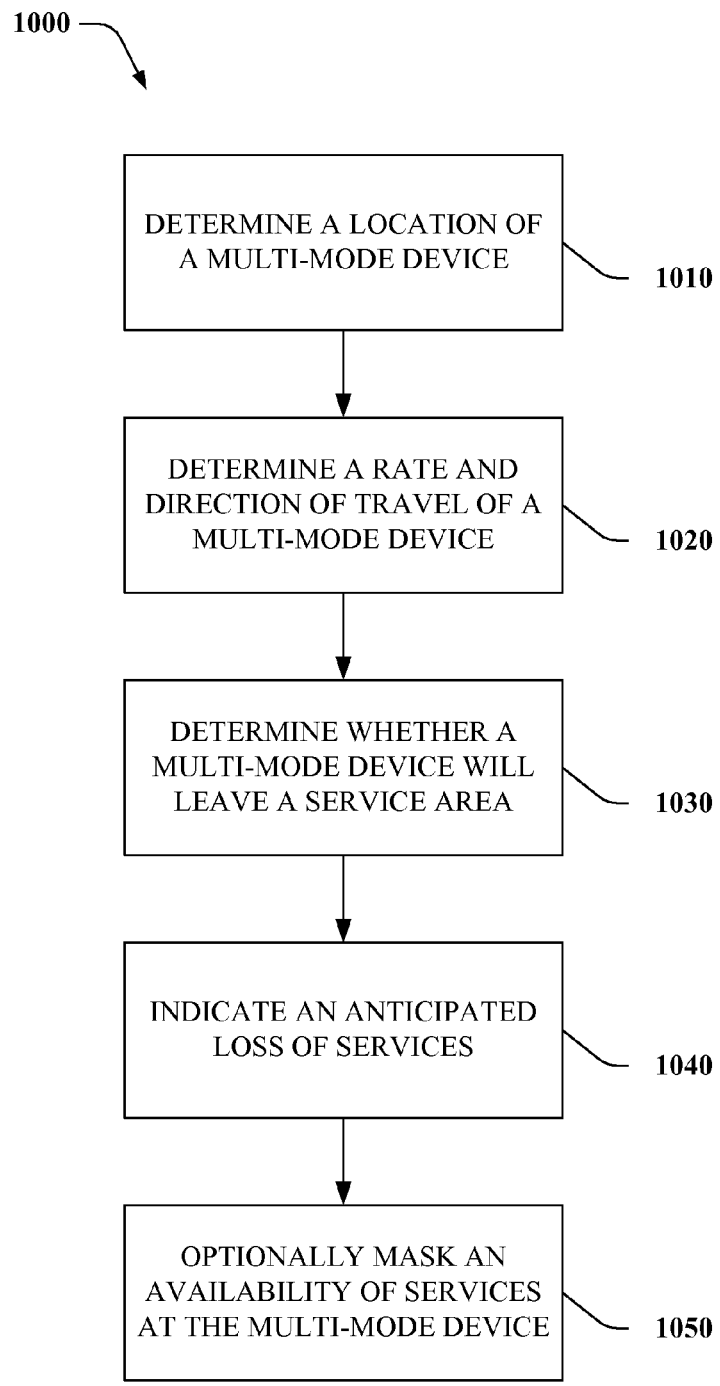
FIG. 10 is a methodology for determining a direction of travel of a mobile device and indicating an expected loss of services ensuing from an inferred path of travel.

Referring now to FIG. 10, a methodology for alerting a mobile device user of impending loss of voice and data services caused by projected travel out of range of network support for such services is depicted. At 1010, a location of a multi-mode device is determined (e.g., obtained from a GPS device, network location component, or similar network and/or device associated component). At 1020, a determination of a rate and direction of travel of a multi-mode device is made. Rate and direction of travel can be determined by taking subsequent device location determinations and noting the distance and time elapsed between such locations. Other mechanisms for monitoring a direction and rate of travel, known in the art or made known to one of skill in the art by way of the context provided by the subject disclosure, are incorporated herein.

At 1030, a determination is made as to whether a multi-mode device will lose network support for mobile voice and data services (e.g., by traveling outside of a geographic area covered by such networks, exceeding the bandwidth of and/or losing sufficient RF contact with such networks, etc.). Such determination can be based on, for instance, mapping of quality of service associated with communication networks surrounding the location, and comparing the quality of service to a predetermined quality threshold, as describe supra. At 1040, an indication of an anticipated loss of mobile voice and data services can be made if the determination at 1030 results in a likelihood that the device will lose network support for mobile voice and data services (e.g., if the quality of service drops below a quality threshold, due to travel out of network coverage range, or the like). Examples of indication mechanisms can include an audio tone and/or audio voice file playback component, an illumination component on the multi-mode device, and/or a GUI of a multi-mode device. At 1050, availability of mobile voice and data services is optionally masked if the multi-mode device is about to lose network support for such services, as described above.

Figure 11:
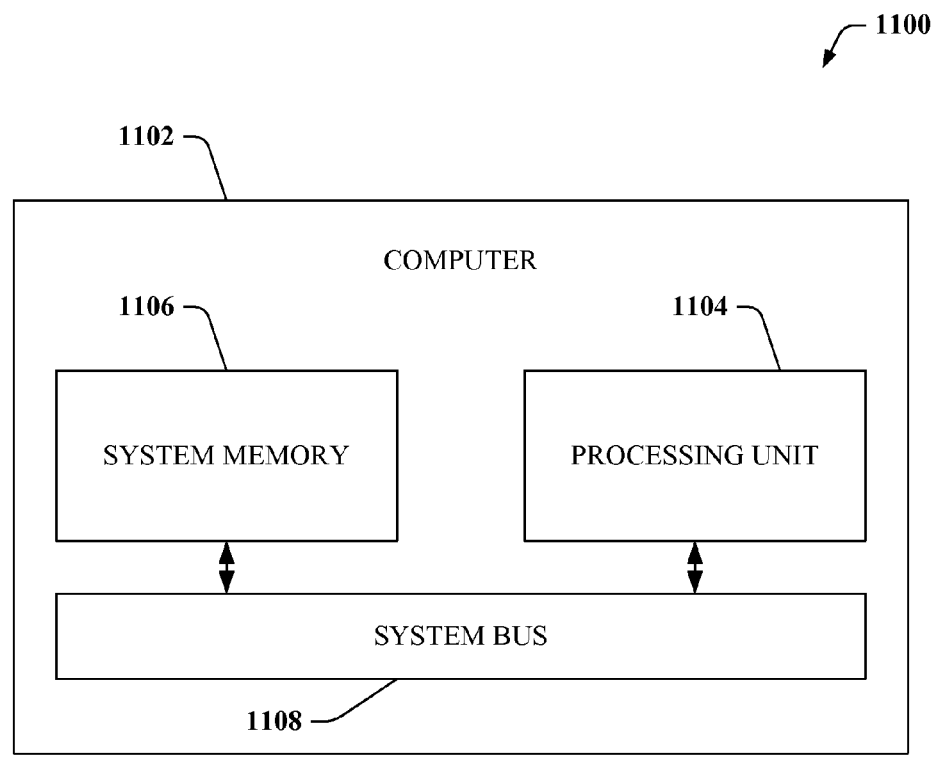
FIG. 11 illustrates an example computing environment that can be employed in connection with various aspects described herein.

Referring now to FIG. 11, there is illustrated a block diagram of a computer operable to provide networking and communication capabilities between a wired or wireless communication network and a server and/or communication device. While shown through use of a computer or computing components, it is understood that the claimed subject matter may be implemented as a method, apparatus, or article of manufacture using standard programming and/or engineering techniques to produce software, firmware, hardware, or any combination thereof to control a computing device, such as a mobile handset, to implement the disclosed subject matter. The term "article of manufacture" as used herein is intended to encompass a computer program accessible from any computer-readable device, carrier, or media. For example, computer readable media can include but is not limited to magnetic storage devices (e.g., hard disk, floppy disk, magnetic strips . . . ), optical disks (e.g., compact disk (CD), digital versatile disk (DVD) . . . ), smart cards, SIM cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

In order to provide additional context for various aspects of the claimed subject matter, FIG. 11 and the following discussion are intended to provide a brief, general description of a suitable computing environment 1100 in which the various aspects described herein can be implemented. While the description above is in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors, such a single core processor, a multi-core processor, or any other suitable arrangement of processors.

The system bus 1108 can be any of several types of bus structure that may further interconnect to a memory bus (with or without a memory controller), a peripheral bus, and a local bus using any of a variety of commercially available bus architectures. The system memory 1106 can include read-only memory (ROM), random access memory (RAM), high-speed RAM (such as static RAM), EPROM, EEPROM, and/or the like. Additionally or alternatively, the computer 1102 can include a hard disk drive, upon which program instructions, data, and the like can be retained. Moreover, removable data storage can be associated with the computer 1102. Hard disk drives, removable media, etc. can be communicatively coupled to the processing unit 1104 by way of the system bus 1108.

The system memory 1106 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 1102 through one or more wired/wireless input devices, such as a keyboard, pointing and clicking mechanism, pressure sensitive screen, microphone, joystick, stylus pen, etc. A monitor or other type of interface can also be connected to the system bus 1108.

The computer 1102 may operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 1102 can connect to other devices/networks by way of antenna, port, network interface adaptor, wireless access point, modem, and/or the like.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
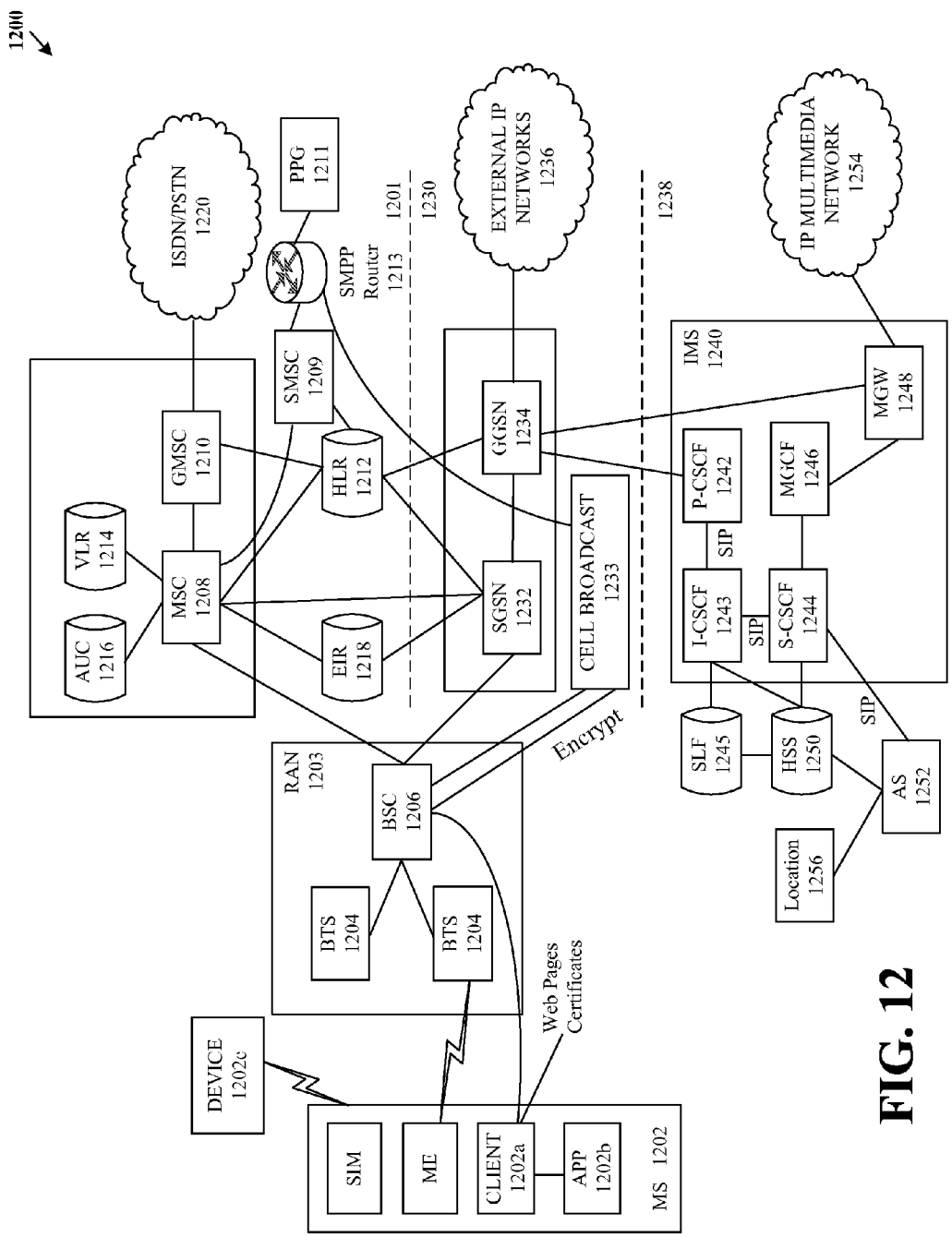
FIG. 12 is an example networking environment that can employ the various embodiments.

Now turning to FIG. 12, such figure depicts a GSM/GPRS/IP multimedia network architecture 1200 that includes a GSM core network 1201, a GPRS network 1230 and an IP multimedia network 1238. The GSM core network 1201 includes a Mobile Station (MS) 1202, at least one Base Transceiver Station (BTS) 1204 and a Base Station Controller (BSC) 1206. The MS 1202 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1202 includes an embedded client 1202a that receives and processes messages received by the MS 1202. The embedded client 1202a may be implemented in JAVA and is discussed more fully below.

The embedded client 1202a communicates with an application 1202b that provides services and/or information to an end user. One example of the application may be navigation software that provides near real-time traffic information that is received via the embedded client 1202a to the end user. The navigation software may provide road conditions, suggest alternate routes, etc. based on the location of the MS 1202. Those of ordinary skill in the art understand that there are many different methods and systems of locating an MS 1202.

Alternatively, the MS 1202 and a device 1202c may be enabled to communicate via a short-range wireless communication link, such as BLUETOOTH. For example, a BLUETOOTH SIM Access Profile may be provided in an automobile (e.g., device 1202c) that communicates with the SIM in the MS 1202 to enable the automobile's communications system to pull information from the MS 1202. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 1202c. There may be an endless number of devices 1202c that use the SIM within the MS 1202 to provide services, information, data, audio, video, etc. to end users.

The BTS 1204 is physical equipment, such as a radio tower, that enables a radio interface to communicate with the MS. Each BTS may serve more than one MS. The BSC 1206 manages radio resources, including the BTS. The BSC may be connected to several BTSs. The BSC and BTS components, in combination, are generally referred to as a base station (BSS) or radio access network (RAN) 1203.

The GSM core network 1201 also includes a Mobile Switching Center (MSC) 1208, a Gateway Mobile Switching Center (GMSC) 1210, a Home Location Register (HLR) 1212, Visitor Location Register (VLR) 1214, an Authentication Center (AuC) 1216, and an Equipment Identity Register (EIR) 1218. The MSC 1208 performs a switching function for the network. The MSC also performs other functions, such as registration, authentication, location updating, handovers, and call routing. The GMSC 1210 provides a gateway between the GSM network and other networks, such as an Integrated Services Digital Network (ISDN) or Public Switched Telephone Networks (PSTNs) 1220. In other words, the GMSC 1210 provides interworking functionality with external networks.

The HLR 1212 is a database or component(s) that comprises administrative information regarding each subscriber registered in a corresponding GSM network. The HLR 1212 also includes the current location of each MS. The VLR 1214 is a database or component(s) that contains selected administrative information from the HLR 1212. The VLR contains information necessary for call control and provision of subscribed services for each MS currently located in a geographical area controlled by the VLR. The HLR 1212 and the VLR 1214, together with the MSC 1208, provide the call routing and roaming capabilities of GSM. The AuC 1216 provides the parameters needed for authentication and encryption functions. Such parameters allow verification of a subscriber's identity. The EIR 1218 stores security-sensitive information about the mobile equipment.

A Short Message Service Center (SMSC) 1209 allows one-to-one Short Message Service (SMS) messages to be sent to/from the MS 1202. A Push Proxy Gateway (PPG) 1211 is used to "push" (e.g., send without a synchronous request) content to the MS 1202. The PPG 1211 acts as a proxy between wired and wireless networks to facilitate pushing of data to the MS 1202. A Short Message Peer to Peer (SMPP) protocol router 1213 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS 1202 first registers with the network to indicate its current location by performing a location update and IMSI attach procedure. The MS 1202 sends a location update including its current location information to the MSC/VLR 1208/1214, via the BTS 1204 and the BSC 1206. The location information is then sent to an HLR associated with MS 1202. The HLR (1212) is updated with the location information received from the MSC/VLR 1208/1214. The location update also is performed when the MS 1202 moves to a new location area. Typically, the location update is periodically performed to update the database as location updating events occur.

The GPRS network 1230 is logically implemented on the GSM core network architecture by introducing two packet-switching network nodes, a serving GPRS support node (SGSN) 1232, a cell broadcast and a Gateway GPRS support node (GGSN) 1234. The SGSN 1232 is at the same hierarchical level as the MSC 1208 in the GSM network. The SGSN 1232 controls the connection between the GPRS network and the MS 1202. The SGSN also keeps track of individual MS's (1202) locations and security functions and access controls.

A Cell Broadcast Center (CBC) 1233 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1234 provides a gateway between the GPRS network and a public packet network (PDN) or other IP networks 1236. That is, the GGSN 1234 provides interworking functionality with external networks, and sets up a logical link to the MS 1202 through the SGSN 1232. When packet-switched data leaves the GPRS network, it is transferred to an external TCP-IP network 1236, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1230 can be designed to operate in three network operation modes (NOM1, NOM2 and NOM3). A network operation mode of a GPRS network is indicated by a parameter in system information messages transmitted within a cell. The system information message(s) dictates to a MS 1202 where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages from a circuit switched network while receiving data and vice versa.

The IP multimedia network 1238 was introduced with 3GPP Release 5, and includes an IP multimedia subsystem (IMS) 1240 to provide rich multimedia services to end users. A representative set of the network entities within the IMS 1240 are a call/session control function (CSCF), a media gateway control function (MGCF) 1246, a media gateway (MGW) 1248, and a master subscriber database, called a home subscriber server (HSS) 1250. The HSS 1250 may be common to the GSM network 1201, the GPRS network 1230 as well as the IP multimedia network 1238.

The IP multimedia system 1240 is built around the call/session control function, of which there are three types: an interrogating CSCF (I-CSCF) 1243, a proxy CSCF (P-CSCF) 1242, and a serving CSCF (S-CSCF) 1244. The P-CSCF 1242 is the MS's first point of contact with the IMS 1240. The P-CSCF 1242 forwards session initiation protocol (SIP) messages received from the MS to a SIP server in a home network (and vice versa) of the MS. The P-CSCF 1242 may also modify an outgoing request according to a set of rules defined by the network operator (for example, address analysis and potential modification).

The I-CSCF 1243 forms an entrance to a home network and hides the inner topology of the home network from other networks, and provides flexibility for selecting an S-CSCF. The I-CSCF 1243 may contact a subscriber location function (SLF) 1245 to determine which HSS 1250 to use for the particular subscriber, if multiple HSS's 1250 are present. The S-CSCF 1244 performs the session control services for the MS 1202. This includes routing originating sessions to external networks and routing terminating sessions to visited networks. The S-CSCF 1244 also decides whether an application server (AS) 1252 is required to receive information on an incoming SIP session request to ensure appropriate service handling. This decision is based on information received from the HSS 1250 (or other sources, such as an application server 1252). The AS 1252 also communicates to a location server 1256 (e.g., a Gateway Mobile Location Center (GMLC)) that provides a position (e.g., latitude/longitude coordinates) of the MS 1202.

The HSS 1250 contains a subscriber profile and keeps track of which core network node is currently handling the subscriber. It also supports subscriber authentication and authorization functions (AAA). In networks with more than one HSS 1250, a subscriber location function provides information on the HSS 1250 that contains the profile of a given subscriber.

The MGCF 1246 provides interworking functionality between SIP session control signaling from the IMS 1240 and ISUP/BICC call control signaling from the external GSTN networks (not shown). It also controls the media gateway (MGW) 1248 that provides user-plane interworking functionality (e.g., converting between AMR- and PCM-coded voice). The MGW 1248 also communicates with other IP multimedia networks 1254.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a memory to store executable instructions; and
   a processor, coupled to the memory, that facilitates execution of the executable instructions to perform operations, comprising:
   detecting a handoff event comprising a mobile device having been registered on an Internet protocol capable network access device and having transitioned to a non-Internet protocol capable network access device,
   determining a handoff frequency with which the mobile device transfers connection from Internet protocol capable network access devices to non-Internet protocol capable network access devices;
   selectively masking an availability of an Internet protocol dependent mobile service via a user interface of the mobile device in response to the handoff frequency being determined to satisfy a condition defined by a function, wherein the function relates the handoff frequency to a reliability metric of the Internet protocol dependent mobile service; and
   outputting, via the user interface of the mobile device and in response to the handoff frequency being determined to satisfy the condition, an indication that support for the Internet protocol dependent mobile service is limited relative to defined full support.

2. The system of claim 1, wherein the selectively masking comprises selectively masking the availability of a subset of available Internet protocol dependent mobile services at the mobile device in response to the handoff frequency being determined to satisfy the condition defined by the function.

3. The system of claim 1, wherein the detecting the handoff event, the determining the handoff frequency or the selectively masking the availability of the Internet protocol dependent mobile service is executed at least in part by processing performed at the mobile device.

4. The system of claim 1, the operations further comprising analyzing individual sectors of a network and determining a quality of service parameter associated with a sector of the individual sectors.

5. The system of claim 4, wherein the determining the quality of service parameter comprises determining the quality of service parameter from a radio frequency quality indicator for the sector.

6. The system of claim 4, the operations further comprising comparing the radio frequency quality indicator with a threshold quality of service parameter associated with the Internet protocol dependent mobile service.

7. The system of claim 1, the operations further comprising disabling a masked service until network support for the masked service is re-established.

8. The system of claim 2, the operations further comprising selectively exposing availability of the subset of the available Internet protocol dependent mobile services at least in part in response to a stored parameter being determined to present user profile data representing a parameter of a user profile indicative of approval for selectively exposing availability of the subset of the available Internet protocol dependent mobile services.

9. The system of claim 1, the operations further comprising referencing profile data representing a user profile and obtaining a stored parameter pertaining to a mobile device output that is indicative of limited network support for the Internet protocol dependent mobile service relative to full network support; and customizing the indication that support for the Internet protocol dependent mobile service is limited relative to the full network support in accord with the stored parameter.

10. The system of claim 1, wherein the processor and memory are at least in part integrated as part of the mobile device, and wherein the operations further comprise:
monitoring the handoff frequency and comparing monitored value of the handoff frequency with the condition;
obtaining a saved parameter of profile data representing a user profile of the mobile device, the saved parameter pertaining to disabling of voice and data services at the mobile device in response to limited network support for the voice and data services relative to full network support; and
disabling a masked service in response to the monitored value being determined to satisfy the condition and in response to the saved parameter being determined to permit disablement of the masked service.

11. The system of claim 10, the operations further comprising re-enabling the masked service in response to the monitored value being determined not to satisfy the condition, terminating output of the indication that support for the mobile voice and data service is limited at the user interface of the mobile device or outputting another indication that support for the mobile voice and data service has resumed.

12. A method, comprising:
detecting, by a device comprising a processor, a handoff event comprising a registration of a mobile device with an Internet protocol capable network access device being terminated, and initiation of a subsequent registration for the mobile device at a non-Internet protocol capable network access device;
determining, by the device, a handoff event frequency with which the handoff event occurs for the mobile device;
selectively masking, by the device, an availability of an Internet protocol dependent mobile service via a user interface of the mobile device in response to the frequency being determined to satisfy a condition defined by a function, wherein the function relates the handoff event frequency for the mobile device to a reliability metric for the Internet protocol dependent mobile service; and
outputting, by the device and utilizing the user interface of the mobile device, an indication that support for the Internet protocol dependent mobile service is limited relative to defined full support.

13. The method of claim 12, further comprising disabling the Internet protocol dependent mobile service via the user interface of the mobile device until network support for the Internet protocol dependent mobile service is re-established.

14. The method of claim 12, further comprising:
obtaining, by the device, a location of the mobile device; and
identifying, by the device, a set of Internet protocol capable network access devices within a defined range of the location.

15. The method of claim 14, further comprising determining, by the device, respective quality of service parameters for network access devices of the set of Internet protocol capable network access devices.

16. The method of claim 15, further comprising comparing, by the device, the respective quality of service parameters with another condition defined by a reliability function associated with the Internet protocol dependent mobile service.

17. The method of claim 16, further comprising determining, by the device, whether one of the respective quality of service parameters satisfies the condition.

18. The method of claim 17, further comprising:
determining, by the device, an identity of one of the set of Internet protocol capable network access devices associated with the one of the respective quality of service parameters in response to the one of the respective quality of service parameters being determined to satisfy the condition; and
activating, by the device, an indicator via the user interface of the mobile device related to a notification of existence of support for the Internet protocol dependent mobile service within a defined proximity of the mobile device.

19. A non-transitory computer-readable storage medium storing executable instructions that, in response to execution, cause a device comprising a processor to perform operations, comprising:
detecting a handoff event comprising a service of a mobile device with an Internet protocol capable network access device being terminated, and initiation of a subsequent service for the mobile device at a non-Internet protocol capable network access device;
determining a frequency with which the handoff event occurs for the mobile device;
selectively masking an availability of an Internet protocol dependent mobile service via a user interface of the mobile device in response to the frequency being determined to satisfy a condition defined by a function, wherein the function relates the frequency for the mobile device to a reliability metric for the Internet protocol dependent mobile service;

conditioning the selectively masking the availability of the Internet protocol dependent mobile service on a status of a stored user data value of user account data associated with the mobile device; and outputting via the user interface of the mobile device an indication that support for the Internet protocol dependent mobile service is limited relative to defined full support.

20. The non-transitory computer-readable storage medium of claim 19, wherein the operations further comprise:

obtaining a location of the mobile device; and identifying a set of Internet protocol capable network access devices within a defined range of the location.

21. The non-transitory computer-readable storage medium of claim 19, wherein the operations further comprise:

determining respective quality of service parameters for network access devices of the set of Internet protocol capable network access devices;

comparing the respective quality of service parameters with another condition defined by a reliability function associated with the Internet protocol dependent mobile service;

determining whether one of the respective quality of service parameters satisfies the condition;

determining an identity of one of the set of Internet protocol capable network access devices associated with the one of the respective quality of service parameters in response to the one of the respective quality of service parameters being determined to satisfy the condition; and activating an indicator via the user interface of the mobile device related to a notification of existence of support for the Internet protocol dependent mobile service within a defined proximity of the mobile device.

* * * * *